(12) United States Patent
Douglas et al.

(10) Patent No.: US 12,541,090 B2
(45) Date of Patent: Feb. 3, 2026

(54) PHOTO-MAGNETICALLY ACTUATED DEFORMABLE MIRROR

(71) Applicant: ARIZONA BOARD OF REGENTS ON BEHALF OF THE UNIVERSITY OF ARIZONA, Tucson, AZ (US)

(72) Inventors: Ewan S. Douglas, Tucson, AZ (US); Amit Kumar Jha, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 336 days.

(21) Appl. No.: 18/549,086

(22) PCT Filed: Mar. 3, 2022

(86) PCT No.: PCT/US2022/018762
§ 371 (c)(1),
(2) Date: Sep. 5, 2023

(87) PCT Pub. No.: WO2022/187530
PCT Pub. Date: Sep. 9, 2022

(65) Prior Publication Data
US 2024/0168281 A1    May 23, 2024

Related U.S. Application Data

(60) Provisional application No. 63/155,973, filed on Mar. 3, 2021.

(51) Int. Cl.
*G02B 26/08* (2006.01)
*G02B 23/06* (2006.01)

(52) U.S. Cl.
CPC ......... *G02B 26/0825* (2013.01); *G02B 23/06* (2013.01)

(58) Field of Classification Search
CPC .................. G02B 26/0825; G02B 23/06
(Continued)

(56) References Cited

U.S. PATENT DOCUMENTS

| 4,954,789 A | 9/1990 | Sampsell |
| 2009/0303571 A1 | 12/2009 | Sandstrom |
| 2020/0284880 A1 | 9/2020 | Bartlett et al. |

FOREIGN PATENT DOCUMENTS

| DE | 102020210771 A1 * | 8/2021 | ........... G02B 5/0891 |

OTHER PUBLICATIONS

International Search Report and Written Opinion, Application No. PCT/US2022/041317, prepared Dec. 12, 2022, mailed Jan. 20, 2023.

(Continued)

*Primary Examiner* — William Choi
(74) *Attorney, Agent, or Firm* — Bond, Schoeneck & King, PLLC; George R. McGuire

(57) ABSTRACT

In an aspect of the present invention, a new active optic is provided, namely, a photo-magnetically actuated deformable mirror (PMADM) made of a magnetic composite structure and an optical quality substrate layer. The magnetic layer is composed of Polydimethylsiloxane (PDMS) and powdered ferromagnetic $CrO_2$. A magnet may be used to deform the mirror surface. The powdered $CrO_2$ has a low Curie temperature (preferably around 395 K) which allows changing the magnetization of the magnetic layer using a laser heating source, thus providing control over the deformation. In one embodiment, the structure has an overall dimension of 1.2 inch 1.2 inch 175 μm with an optical pupil diameter of 8 mm. The PMADM is estimated to deform to a maximum stroke of 8.7731 μm before failure with a 3 safety factor.

6 Claims, 7 Drawing Sheets

(58) Field of Classification Search
USPC .......................................................... 359/315
See application file for complete search history.

(56) References Cited

OTHER PUBLICATIONS

Dunayevsky, Jonathan, "MEMS Spatial Light Modulator for Spectral Phase and Amplitude Modulation", CLEO: Applications and Technology, Optica Publishing Group, 2011, p. 7-10, 41 [online] < http://scholars.huji.ac.il/sites/default/files/danmarom/files/jonathan_dunayevsky_mems_msc_thesis.pdf >.

Guan, Jiafan, "MEMS-Based Spatial Light Modulation for Long Term and Infrared Beam Steering Applications", Diss. The University of Arizona, 2021, p. 16-18, 32-34 [online] < https://repository.arizona.edu/bitstream/handle/10150/660127/azu_etd_18802_sip1_m.pdf?sequence=1 >.

* cited by examiner

PHOTO-MAGNETICALLY ACTUATED DEFORMABLE MIRROR

CROSS-REFERENCE TO RELATED APPLICATION

The present application is a U.S. National State Application, filed under 35 U.S.C. 371, of International Application No. PCT/US22/18762, filed on Mar. 3, 2022, which relates and claims priority to U.S. Provisional Application Ser. No. 63/155,973, filed Mar. 3, 2021, the entire disclosure of which is hereby incorporated by reference.

GOVERNMENT FUNDING

N/A

FIELD OF THE INVENTION

The present disclosure is directed generally to photo-magnetically actuated and deformable mirrors.

BACKGROUND

Active optical elements have wide applications ranging from astronomical imaging to laser optics and consumer cameras.

Dynamical optical elements that modify wavefronts (phase or amplitude) have a wealth of applications. Examples include, focus control for consumer and commercial cameras and microscopes, correction of telescope misalignments at nanometer and picometer levels wavefront correction with DMs for astronomical imaging and vision science, laser communications, and directed energy and image slicing, to name a few. However, responsive optical elements often come with significant actuator and drive electronics challenges. MEMS and Lead-Magnesium-Niobate ($MgNb_2O_9Pb_3$) DMs are the ones commonly used and require hundreds to thousands of channels at >100V which makes the fabrication process complex. Despite recent progress at the 1000 actuator mark, high-voltage controller electronics limit design scalability particularly for vacuum and space-applications. Liquid deformable lenses have recently been tested for space-communication applications but require high voltage (100V) to control deformation. Magnetic fluid deformable mirrors (MFDM) provide high surface quality and high-precision but are limited in applications and degree of freedom as they are constrained to operate horizontally under gravity. Some ground-based observatories have implemented deformable secondary mirrors using thin shells driven by voice coil actuators. However, due to the high voltages and currents required, scaling these proven systems is challenging while maintaining other critical performance values such as surface quality.

Active focus control is the first-order correction of deformable optics and one focus of the present invention. Autofocus lenses use miniaturized motors which improve focusing capability but increases complexity and risk of failure. The Very Large Telescope (VLT) interferometer mode uses an air-pressure driven stainless steel focusing optic for high dynamic range. DMs that are optically rather than electrically driven can be used as a possible alternative to the existing intricate designs. It has been proposed that photo-controlled mirrors that employ photoconductive substrate to vary the voltage applied to a membrane mirror. Photo-controlled mirrors allow optical addressing, allowing high density, remote control without the need for high-voltage.

Magnetic composite coated optical substrates offer another possible option. A magnetic field can be used to deform their surface and zonal variation of the magnetization by heating (e.g. with laser light) causes the mirror to relax, allowing optical addressing. A thin optical quality substrate such as glass or silicon can be used too to achieve high-surface quality.

Recently, it has been demonstrated that a magnetic composite structure made of 66.7% PDMS and 33.3% $CrO_2$ by weight which can be actuated by a magnet and shows relaxation in deflection when heated by a laser source. The structure has many applications ranging from soft robotics to optomechanics. A FEM model has also been developed that simulates the same structure and estimates the amount of deflection and relaxation caused by the magnet and the laser source.

Accordingly, based on these advances, there is a need in the art for a photo-magnetically actuated deformable mirror (PMADM).

SUMMARY

The present disclosure is directed to photo-magnetically actuated and deformable mirrors.

According to an aspect is a photo-magnetically actuated deformable mirror having a mirror surface, comprising a magnetic layer comprising a predetermined chemical coating; an optical quality substrate layer; and a magnet adapted to deform the mirror surface.

According to an embodiment, the predetermined chemical coating comprises Polydimethylsiloxane (PDMS) and powdered ferromagnetic $CrO_2$.

According to an embodiment, the powdered $CrO_2$ has a predetermined Curie temperature selected to permit changing the magnetization of the magnetic layer using the laser heating source, whereby control is provided over the deformation.

According to an embodiment, the predetermined Curie temperature is about 395 K.

According to an embodiment, the photo-magnetically actuated deformable mirror further comprises a laser heating source.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Figure 1:
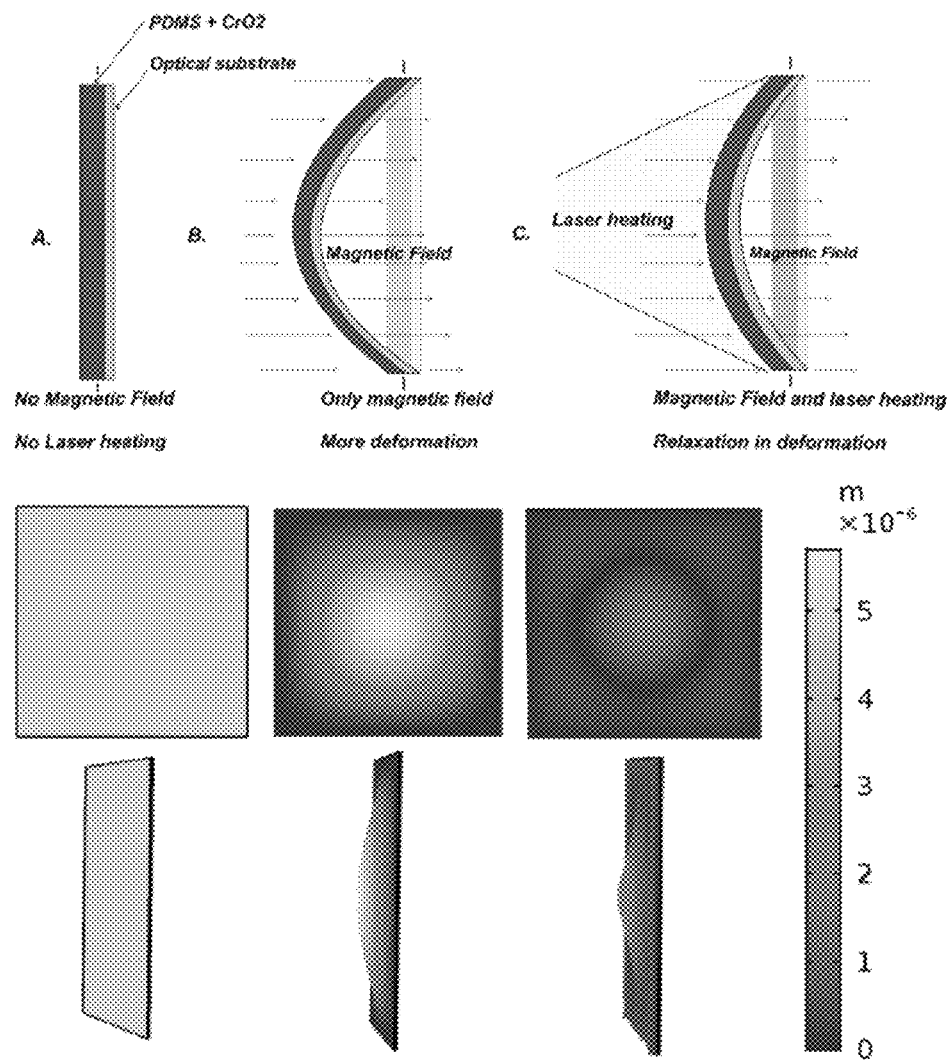
FIG. 1 is an illustration (top) showing the effects of magnetic field and laser heating on PMADM. The magnetic field causes more deformation when the laser is off. The laser causes heating of the PMADM surface causing decrease in magnetization of the magnetic layer resulting in relaxation. COMSOL simulation results of Si side (middle) and cross section view (bottom) of PMADM. All the edges of the PMADM are fixed.
Figure 2:
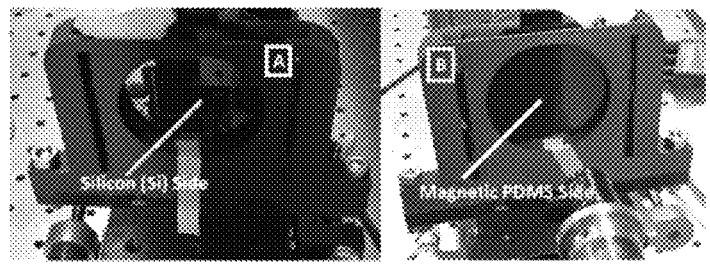
FIG. 2 are snapshots of PMADM taken in the laboratory. The left image (A) shows the Silicon (Si) side whereas the right image (B) shows the magnetic PDMS side of the structure.

The present disclosure describes photo-magnetically actuated and deformable mirrors.

In one embodiment, a photo-magnetically actuated and deformable mirror (PMADM) having the same magnetic composite structure and FEM simulation model to simulate, fabricate, and test in laboratory settings. The PMADM structure is 1.2 inch 1.2 inch 175 μm in dimension and has a 150 μm magnetic composite (66.7% PDMS and 33.3% CrO2) and a 25 μm silicon layer.

The methods adopted to simulate, fabricate, and experimentally test the PMADM are described below. A COMSOL Multiphysics simulation platform was used to develop the FEM model of the deformable mirror. In its test embodiment, the PMADM geometry is rectangular in shape with dimensions 1.2 inch 1.2 inch 175 μm. The structure is composed of two layers which are crosslinking magnetic PDMS (PDMS+$CrO_2$) (150 μm) and Si layer (25 μm) respectively. Due to the gradient nature of the magnetic layer, it is further distinctly divided into two equal layers for simulation purposes. Thus, the structure has three layers— PDMS layer with little to no $CrO_2$ concentration (P-Side with thickness of 75 μm), PDMS with high $CrO_2$ concentration (C-Side with thickness of 75 μm), and Silicon layer (Si with thickness of 25 μm).

The material properties used for each layer have been experimentally determined in previous works and are summarized in Table 1. The magnetic properties of the $CrO_2$+ PDMS composite layer has previously been experimentally measured. Equation. 1 shows the dependence of magnetization ($\vec{m}$) of the magnetic layer on Curie temperature ($T_C$) and substrate temperature (T) where C and β are Curie constant and critical exponent factor with values C=5.661, and β=0.2984 respectively.

$$|\vec{m}(T)| = C(T_C - T)^\beta \quad (1)$$

Equation 2 relates the magnetization ($\vec{m}$) with magnetic susceptibility ($\chi$), permeability of free space ($\mu_0$), and magnetic field density ($\vec{B}$).

$$\vec{m} = (\chi/\mu_0)\vec{B} \quad (2)$$

Figure 14:
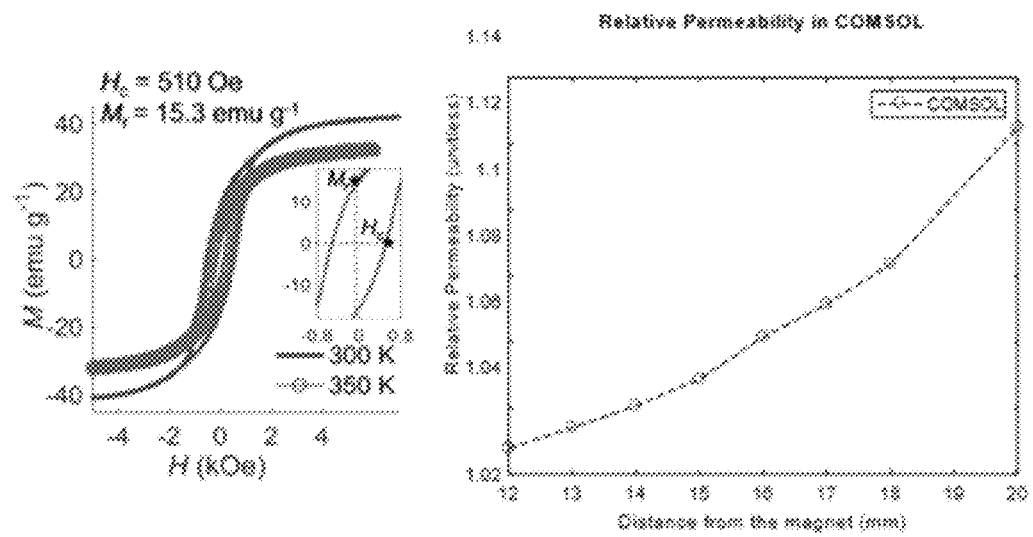
FIG. 14 is a Hysteretic plot of magnetization (left) of CrO2. Plot of relative permeability (right) with changing separation distance from the magnet.

It has been shown (also shown in Figure. 14 (left)) that the slope of the hysteretic magnetization of pretreated CrO2 is non-linear with applied magnetic field strength. The slope of the curve is directly proportional to the magnetic susceptibility ($\chi$) which is related to the relative permeability ($\mu$) as given by equation. 3.

$$\mu = 1 + \chi \quad (3)$$

Table 1 below shows the material properties of PDMS (crosslinkage PDMS polymer), magnetic PDMS (crosslinking PDMS with 33.3% CrO2), and Si layer of the PMADM.

TABLE 1

| Material properties | P-Side (PDMS) | C-Side (CrO$_2$ + PDMS) | Silicon (Si) |
|---|---|---|---|
| Young's Modulus | 2.13[MPa] | 2.23[MPa] | 170[GPa] |
| Poisson's Ratio | 0.49 | 0.45 | 0.28 |
| Density | 0.96[g/cm$^3$] | 1.4[g/cm$^3$] | 2.329[g/cm$^3$] |
| Thermal Conductivity | 0.2[W/(m · K)] | 0.25[W/(m · K)] | 130[W/(m · K)] |
| Heat Capacity at Constant Pressure | 2174[J/(kg · K)] | 1840[J/(kg · K)] | 700[J/(kg · K)] |
| Co-efficient of Thermal Expansion | 1.88 × 10$^{-4}$[1/K] | 1.588 × 10$^{-4}$[1/K] | 2.6 × 10$^{-6}$[1/K] |

Thus, to account for the changing x values with changing magnetic field, varying relative permeability values were used for the magnetic PDMS layer in our FEM model. The estimate for the values have been calculated using the equations 2, 3 and the experimental values presented in M. Li, Y. Wang, A. Chen, A. Naidu, B. S. Napier, W. Li, C. L. Rodriguez, S. A. Crooker, and F. G. Omenetto, "Flexible magnetic composites for light-controlled actuation and interfaces," Proc. Natl. Acad. Sci. 115, 8119-8124 (2018).

When the substrate is subjected to a magnetic field, it experiences a magnetic load which is governed by the electromagnetic force density equation given by equation. 4—

$$\vec{F}(\vec{r},t) = (\vec{m} \cdot \vec{\nabla})\vec{B}(\vec{r},t) \quad (4)$$

where $\vec{F}(\vec{r},t)$ is the force acting on the PMADM structure, $\vec{m}$ is the magnetization, and $\vec{B}(\vec{r},t)$ is the magnetic field density. Equation. 1 and 4 shows the dependence of magnetic properties of the PMADM on both the temperature and applied magnetic field strength. Therefore the magnetic load on the PMADM can be varied by changing the applied magnetic field strength or by changing its temperature which will allow control over the magnitude of deformation.

A Gaussian laser source was used in COMSOL to heat the magnetic PDMS side of the PMADM using the equation. 5:

$$I_{source}(r) = P_{Laser}\left(\frac{1}{2\pi\sigma^2}\exp\left(-\frac{r^2}{2\sigma^2}\right)\right) \quad (5)$$

where $P_{Laser}$ is the laser power and $\sigma=2$ mm. The incident laser power heats the area within the optical pupil diameter (D=8 mm) of the PMADM causing its temperature to increase. An increase in temperature will lead to a decrease in the magnetization of the magnetic PDMS layer (governed by equation. 1) of the PMADM causing relaxation in the deformation (governed by equation. 4). To model the convective heat loss in our model, we have also used the heat transfer coefficient, absorption coefficient, and ambient temperature values. The heat transfer coefficient for our model is 49.21 W/m$^2$ K whereas the absorption coefficient is 0.97 respectively. The ambient temperature is set to 303 K (room temperature) in our FEM model.

Fabrication

The process of pretreatment of PDMS and CrO$_2$ for preparing the magnetic PDMS is described in detail in M. Li, Y. Wang, A. Chen, A. Naidu, B. S. Napier, W. Li, C. L. Rodriguez, S. A. Crooker, and F. G. Omenetto, "Flexible magnetic composites for light-controlled actuation and interfaces," Proc. Natl. Acad. Sci. 115, 8119-8124 (2018). Once the magnetic PDMS mixture with 66.7% PDMS and 33.3% CrO$_2$ prepared, it is coated to a thickness of approximately 150 µm onto a 1.2 inch 1.2 inch 25 µm thin layer of a silicon wafer. This process allows the settling of an even layer of magnetic PDMS over the silicon wafer. Once the coating process finishes, the coated wafer is put in a drying chamber (oven) for curing purposes. After the coating is dried, the coated silicon wafer is attached to the acrylic frames to provide rigidity to the structure. The final process gives us the test PMADM that we have used to carry out metrology measurements in the laboratory settings.

Magnetic Deformation Test

Figure 3:
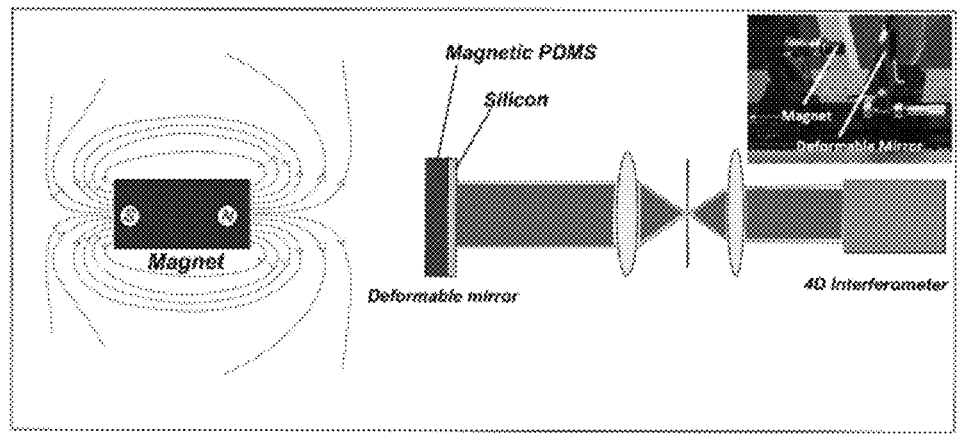
FIG. 3 is an illustration showing the experimental setup used for measuring the surface deformation at the Silicon (Si) side of PMADM. The image at the top right corner is a snapshot of the laboratory setup showing the magnets and PMADM on a moving stage. By changing the relative distance between the magnets and the PMADM sample, we can vary the magnetic load subjected to the PMADM structure.

FIG. 3 shows the experimental setup used to subject magnetic loading on the PMADM. We have used a stack of 8 KJ DC2E disk magnets facing the magnetic PDMS side of the PMADM. On the right side of the structure, we have set up a Phasecam 6000 4D interferometer with a collimating lens assembly to measure the surface deformation on the Silicon (Si) side. We proceeded to measure the deformation at the Si-Side of the PMADM by changing the magnetic flux density via changing the relative distance between the stack of magnets and the PMADM structure.

Results

The simulation and experimental results obtained from the COMSOL FEM simulation model and laboratory testing of the PMADM are presented. The COMSOL simulation data has been further post-processed using SAGUARO (Software Analysis Graphical user interface from the University of Arizona for Research in Optics), an open-source MATLAB GUI based metrology information. We have used it to calculate the Zernike coefficient values and surface RMS figure for our PMADM. The experimental data obtained from the 4D interferometer has been processed in 4SIGHT software to measure metrology information such as Zernike Coefficients.

Simulation of Magnetic Deformation of PMADM

Figure 4:
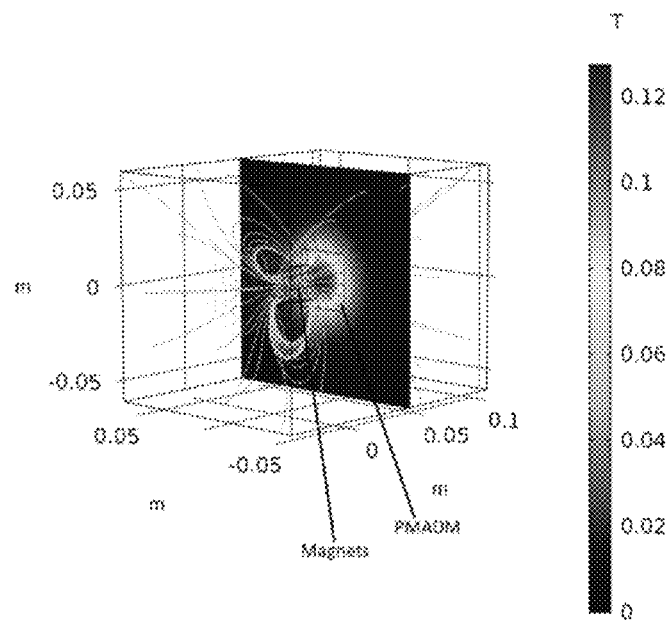
FIG. 4 is a COMSOL Simulation of 8 KJ DC2E magnets subjecting a magnetic load on the PMADM structure. The magnetic field lines (in gray) and the magnetic flux density at the C-Side of the PMADM is shown. The separation between the magnet and the PMADM is 12 mm and a maximum flux density of 0.12 T can be seen at the C-Side of PMADM.

FIG. 4 shows the COMSOL simulation of 8 KJ DC2E magnets delivering the magnetic load on the C-Side of the PMADM. The separation between the magnets and the PMADM is 12 mm. Figure. 4 also shows that the stack of magnets generates a maximum magnetic flux density of around 0.12 T at the C-Side of the PMADM.

Figure 5:
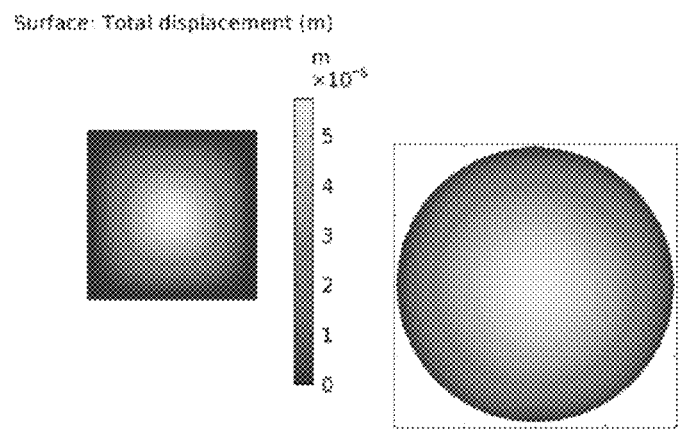
FIG. 5 shows displacement due to the magnetic load (left) on the PMADM surface and displacement map (right) within the optical pupil diameter of the PMADM obtained using SAGUARO. A maximum displacement of 5.7 10-6 m is observed when the separation between the magnets and the PMADM sample is 12 mm.

FIG. 5 (left) shows the displacement map of the PMADM structure due to the magnetic loading. A maximum displacement of around 5.76×10$^{-6}$ m is obtained when the separation between the sample and the magnet is 12 mm. Figure. 5 (right) shows the displacement map at the Silicon side of the PMADM within an optical pupil diameter of 8 mm. The surface map is obtained by post-processing the COMSOL displacement map in SAGUARO.

Figure 6:
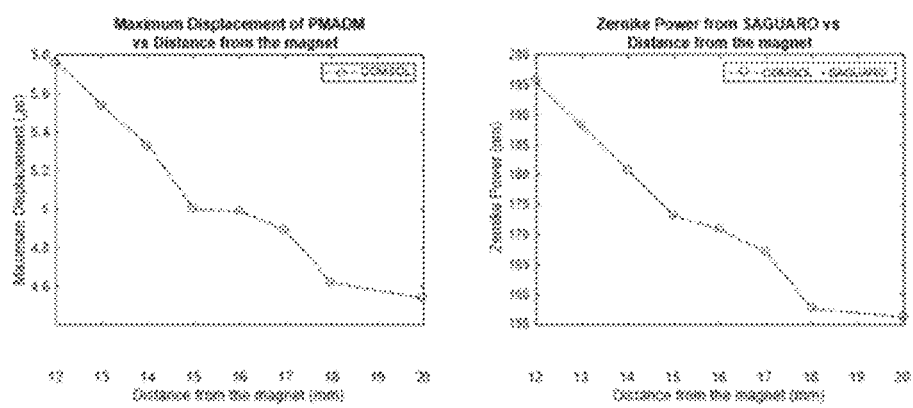
FIG. 6 is a plot showing maximum displacement (left) with changing separation distance between the magnet and the PMADM. Zernike Power term plot (left) obtained from post-processing the displacement maps obtained from COMSOL in SAGUARO considering an optical pupil diameter of 8 mm.

FIG. 6 (left) shows the maximum displacement of the PMADM surface with the varying separation distance between the magnets and the PMADM. As the separation distance between the magnets and the PMADM sample increases, the magnitude of deformation decreases due to a decrease in the magnetic field strength leading to less magnetic loading. Figure. 6 (right) shows the Zernike power coefficient obtained from post-processing the displacement maps in SAGUARO. The Zernike power term is calculated using SAGUARO by considering an optical pupil diameter of 8 mm. The Zernike power term also shows a decreasing trend with the increasing separation distance between the magnets and the PMADM sample as a decrease in magnetic loading causes less peak deformation contributing less to the Zernike power coefficient.

Figure 7:
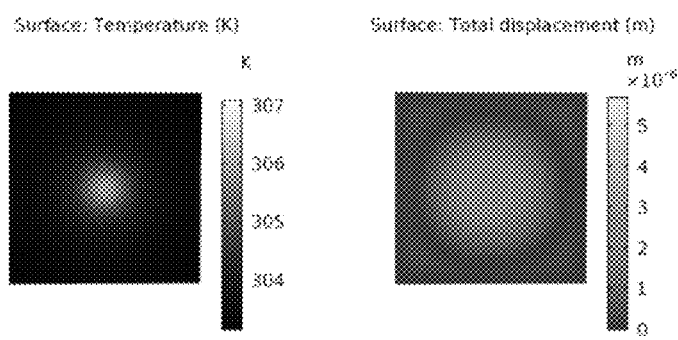
FIG. 7 shows the temperature profile of the PMADM when the distance between the magnets and the PMADM is 12 mm and heated by incident laser power of 50 mW (left) at the magnetic PDMS side. A maximum temperature of 307K can be seen generated as a result of the laser heating on the PMADM surface. The resultant displacement map due to relaxation by laser heating (right) in presence of magnetic loading is shown (right). The maximum displacement relaxes to about $3.7 \times 10^{-6}$ m from $5.7 \times 10^{-6}$ m.

FIG. 7 (left) shows the temperature profile of the PMADM surface when heated by a laser with incident power of 50 mW. We can observe that the temperature within the optical pupil of the PMADM increases up to 307K causing change in magnetization resulting in relaxation which can be seen in figure. 7 (right). With increase in temperature from ambient temperature (303K) to 307K, the maximum displacement relaxes to $3.7 \times 10^{-6}$ m from $5.7 \times 10^{-6}$ µm.

Figure 8:
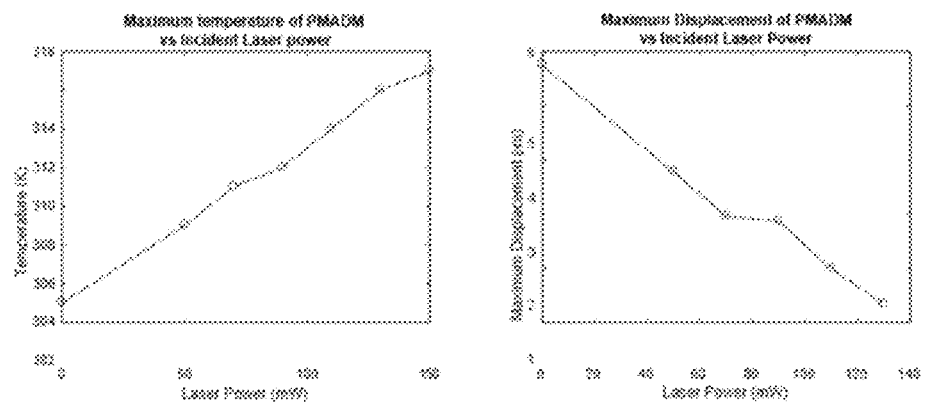
FIG. 8 shows PMADM temperature with varying laser power (left). Maximum displacement due to both magnetic loading and laser heating in PMADM (right) at different incident laser powers. As the laser power increases, more heating occurs causing increase in temperature which in turn causes decrease in magnetization and magnetic loading resulting in more relaxation.

FIG. 8 (left) shows that with increasing laser power, the temperature of our PMADM substrate increases almost linearly. FIG. 8 (right) shows that with increasing temperature, the PMADM shows more relaxation in deflection as an increase in temperature with increasing laser power causes a decrease in magnetization and magnetic load causing more relaxation.

Experimental Test of Magnetic Deformation of PMADM

Figure 9:
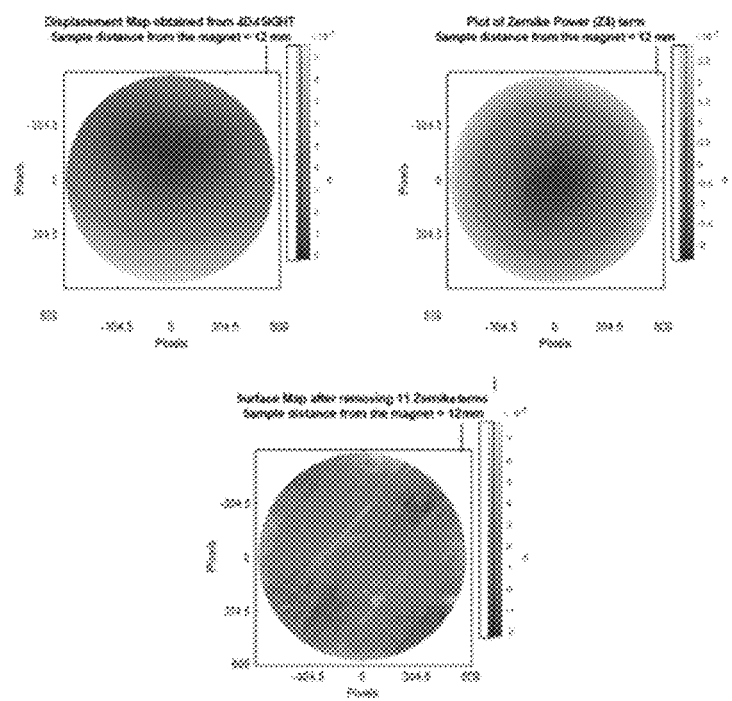
FIG. 9 shows a displacement map (top left) obtained from experimental testing of PMADM sample using 4D interferometer when the sample is at a distance of 12 mm from the magnet. Zernike Power term (top right) obtained after post processing the displacement map (top left) in SAGUARO. Surface map (bottom center) obtained after subtracting 11 Zernike terms from the displacement map shown in FIG. 9 (top left). A surface RMS of around 21 nm is obtained.
Figure 10:
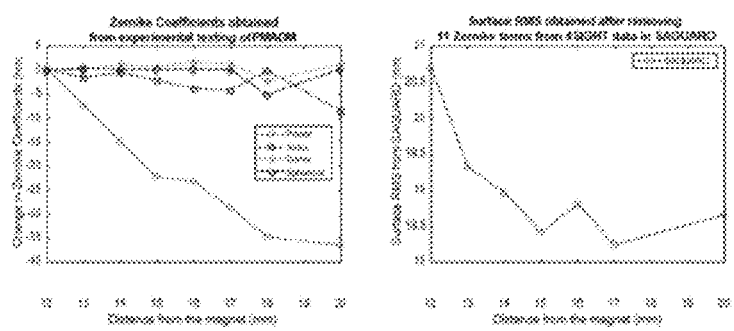
FIG. 10 shows the trend of Zernike coefficient terms (left) obtained from experimental testing of the PMADM. A maximum change of 40 nm can be seen in Zernike Power term when the separation between the magnet and the PMADM is increased from 12 mm to 18 mm. Other Zernike terms are stable to a maximum RMSE of 2.4 nm. Surface RMS figure of the Si-Side of the PMADM is also shown (right). A maximum value of 21 nm is calculated which makes our optical substrate good enough to function as a mirror surface.

FIGS. 9 and 10 shows the experimental results that were obtained by performing the magnetic deformation test of PMADM in the laboratory.

FIG. 9 shows the displacement map (top left), Zernike Power term (top right), and the residual surface map after 11 Zernike subtraction (bottom center) obtained from experimental testing of the PMADM using 4D interferometer when the PMADM is kept at a distance of 12 mm from the magnets. A Zernike power coefficient of 195.5 nm is measured for this case. Bias terms, Piston, Tip/Tilt have been ignored and in the figure. 10, we have shown the change in Zernike coefficients of the power (focus), coma, astigmatism, and spherical aberration term. Only the Zernike power coefficient term shows a decreasing trend, changing by more than 40 nm, whereas the other terms are stable to a maximum of 2.4 nm RMSE which is expected given the fact the contribution to other Zernike terms is possibly due to initial stress in the optics induced during the mounting or fabrication stage. The power term is decreasing due to lesser peak deformation of the PMADM as the magnetic loading decreases with increasing separation between the magnet and the PMADM surface.

FIG. 10 also shows the surface RMS figure obtained from the 4D Interferometer measurements after removing the 11 Zernike terms from the displacement map in SAGUARO. A maximum value of about 21 nm surface RMS is obtained which is a measure of the quality of the optical substrate. Since, the surface RMS is well within the $\lambda/8$ range, the optical substrate layer is good enough to function as a mirror.

Comparison of Simulation and Experimental Results.

Figure 11:
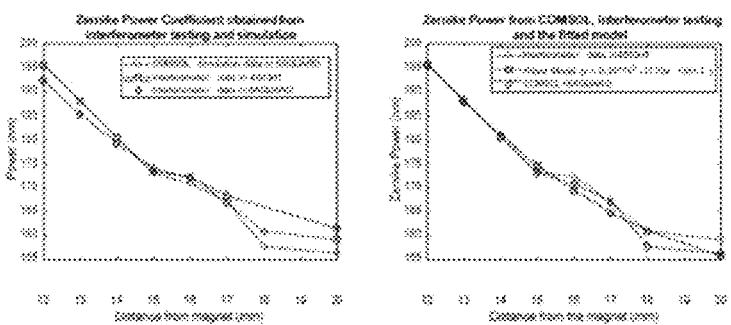
FIG. 11 shows a comparison between Zernike Power term coefficients obtained from laboratory testing (4SIGHT and SAGUARO) and our FEM model (COMSOL+SAGUARO) for our PMADM (left). A curve fitted with 1.8382 nm RMSE (1.12%) (right) is also shown which predicts the nonlinear trend of Zernike power term coefficient with varying separation distance between the magnets and the PMADM when the laser is off.

FIG. 11 (left) shows the comparison between the Zernike power coefficient obtained from post-processing COMSOL simulation data in SAGUARO and post-processing 4D interferometer data in both 4SIGHT and SAGUARO. This has been done to check the efficiency of SAGUARO in obtaining Zernike terms from experimental data. The Zernike power coefficients obtained from processing experimental results in SAGUARO have an RMSE of 1.99 nm (1.11%). Since the RMSE is small, we can use SAGUARO for calculating Zernike terms from COMSOL simulation data and for valid comparison with that obtained from experimental data using 4SIGHT. The Zernike power term obtained shows a decreasing trend with the increasing separation distance between the magnet and the PMADM which is as expected due to the decreasing magnetic field strength and magnetic load. Figure. 11 (right) shows the comparison between the Zernike power term obtained from post-processing COMSOL simulation results in SAGUARO and interferometer results in 4SIGHT. The RMSE error between the two trends is 1.5446 nm (0.096%) A curve has also been fitted which predicts the trend of Zernike power term of the PMADM with varying separation between the magnet and the PMADM. The fitted curve shows a 1.8382 nm RMSE (1.12%) and a nonlinear decreasing trend (shown in FIG. 11 (left)) of Zernike power term with the increasing separation distance between the magnets and the PMADM. The trend is governed by a second-order polynomial which is also shown in the same figure. The polynomial provides a good approximation of the PMADM model to calculate the Zernike Power term. However, our FEM model should be used to obtain a more accurate estimation as it shows the least RMSE to the experimental data.

Simulation of Maximum Stroke

Figure 12:
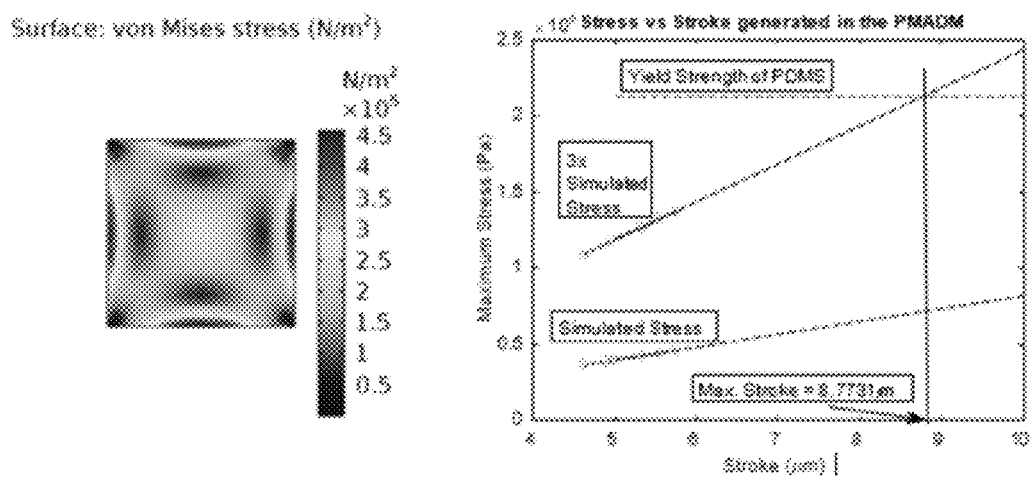
FIG. 12 shows Von mises stress (left) generated in the PMADM when the separation between the magnets and the PMADM is 12 mm. Simulated stress and calculation of maximum stroke (right) with 3× safety margin.

FIG. 12 (left) shows the von mises stress generated in the PMADM when the separation between the magnets and the PMADM is 12 mm and the laser is off. We have also calculated the maximum stress generated in the PMADM using our COMSOL simulation model for varying separation distances between the magnets and the PMADM. Maximum stroke has been calculated which can be seen in the FIG. 12 (right) by taking into consideration a 3× safety margin. This has been executed by comparing the yield strength of the PDMS (which is lowest among the materials used in fabricating the PMADM) with 3 times the maximum stress generated in the PMADM at a different stroke. The maximum stroke is identified as the point where the 3× stress matches the yield strength of the PMADM. From our simulation results, We have estimated a maximum stroke of around 8.7731 µm for our PMADM model before risk/failure with a 3× safety margin.

Summary

Hence, a novel photo-magnetically actuated deformable mirror (PMADM) and its FEM model are provided which demonstrates focus adjustment by using a magnet or a laser heating source. The PMADM has many potential applications in the field of wavefront correction and can also be used for autofocus adjustment for imaging and optomechanics purposes.

One embodiment of the PMADM allows control of focus. To correct higher-order aberrations, an array of optical fibers with a modified PMADM design will provide addressable optical control.

Simulation of KJ DC2E Magnets

Figure 13:
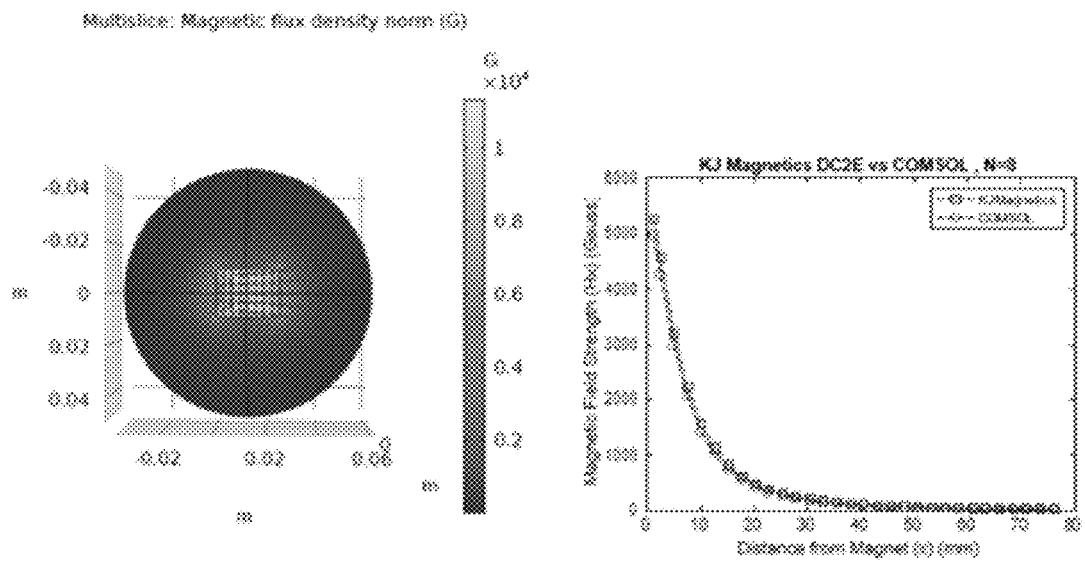
FIG. 13 is a plot of magnetic flux density (left) of 8 KJ DC2E magnets in COMSOL. Comparison plot (right) of varying magnetic field strength with varying probe distance from the magnet obtained from KJ Magnetics website and COMSOL. The RMSE percent error is 17%.

FIG. 13 (left) shows the magnetic flux density plot of a stack of 8 KJ DC2E disk magnets simulated in COMSOL. Figure. 13 (right) shows the comparison plot between the magnetic field strength obtained from the KJ Magnetics website and our COMSOL simulation model with varying probe distance from the magnet. The RMSE obtained is 104.77 G (17%) which shows that the FEM model successfully simulates the magnetic field of the stack of 8 KJ DC2E disk magnets with varying probe distance from the magnet. The magnetic properties and parameters used for modeling the magnets in COMSOL are given in table 2.

TABLE 2

Specifications and magnetic properties of the 8 KJ DC2E magnets used in our model.

| Specification | Neodymium Magnet |
| --- | --- |
| Model | DC2E KJ Magnetics |
| Geometry Type | Cylindrical (Disc) |
| Radius | 0.375[inch] |
| Thickness | 0.125[inch] |
| Remnant Flux Density | 13200[Gauss] |
| Relative Permeability | 1.05 |

Simulation of Magnetic Properties of Magnetic PDMS Layer.

FIG. 14 (left) shows the hysteretic magnetization plot of pretreated CrO2 taken from the works of Meng Li et al. whereas FIG. 14 (right) shows the relative permeability values that we have used in our FEM model to compensate for the non-linear variation of the magnetization of the magnetic PDMS layer with changing applied magnetic field. This has been done because the slope of the magnetization curve with changing magnetic field strength is not constant which is clear from the plot shown in the FIG. 14 (left). As the magnetic field strength decreases, the slope of the hysteretic magnetization curve increases, which is directly proportional to the magnetic susceptibility. The magnetic susceptibility ($\chi$) is related to relative permeability ($\mu$) by equation. 3 and hence, to accommodate these changes, a variable relative permeability in the FEM model is used. This accounts for the adjustment in the $\chi$ values and improves the accuracy of the FEM model.

Figure 15:
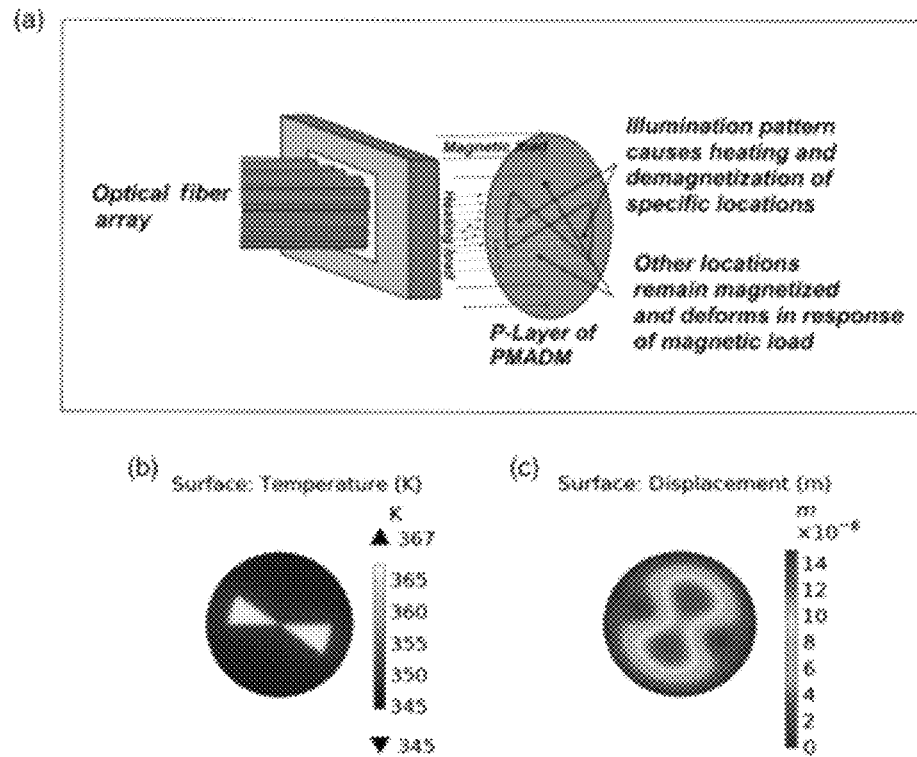
FIG. 15 (a) illustration showing how an illumination pattern can be generated using grids of optical fiber for heating and demagnetization of PMADM, (b) simulated temperature profile generated at the P-layer of the PMADM when illuminated by 120 mW power over 4.8 mm2 illuminated area, and (c) astigmatism like surface deformation generated at the Si-layer of the PMADM because of the illumination and magnetic loading.

Referring to FIG. 15: (a) Illustration showing how an illumination pattern can be generated using grids of optical fiber for heating and demagnetization of PMADM. (b) Simulated temperature profile generated at the P-layer of the PMADM when illuminated by 120 mW power over 4.8 mm2 illuminated area. (c) Astigmatism like surface deformation generated at the Si-layer of the PMADM because of the illumination and magnetic loading. The distance between the magnet and the PMADM sample is 17 mm for this simulation with magnet's south pole facing the P-layer of the PMADM. A COMSOL simulation study is performed where the P-layer of the PMADM is illuminated in a specific pattern to obtain astigmatism like deformation at the Si-layer of the PMADM when the P-layer of the sample is kept at a distance of 17 mm facing the south pole of the magnets. A total power of 120 mW is deposited over the illuminated pattern covering 4.8 mm2 area. Such an illumination pattern can be easily achieved in laboratory setup via a compact optical fiber grid. 54 This simulation study also hints at the capability of the PMADM in aberration corrections beyond focus control. FIG. 14(b) shows the illumination pattern and the temperature distribution due to 120 mW heating at the P-layer of the PMADM. A maximum temperature of 367 K is reached at the P-layer of the PMADM. FIG. 14(c) shows the surface deformation profile at the Si-layer of the PMADM created due to the magnetic loading and illumination. A maximum deformation of about 150 nm is achieved. From this study, it is clear that the area that is heated by the illumination pattern gets demagnetized and hence deforms less compared to the other areas within the optical pupil of the Si-layer of the PMADM.

This work presents laboratory testing of a prototype PMADM and its COMSOL simulation model, which demonstrates focus adjustment using a magnet and a laser heating source. A spatially varying magnetic field or array of magnets would provide an alternative actuation mechanism for the presented device, though the precision afforded by zonal photodemagnetization is expected to provide superior spatial resolution and actuation precision. The presented prototype of our PMADM allows control of focus and can also be modified to correct other aberrations. To correct higher-order aberrations, an array of optical fibers with specific illumination pattern may be used to provide addressable optical control using our PMADM. In the future, we will also explore higher surface quality substrates (>1 RMS), including higher quality silicon surfaces. The PMADM has potential applications in the field of precision wavefront correction and allows autofocus adjustment for imaging and optomechanics purposes. It can also be used for correcting slow low-order wavefront errors (<1 Hz) that may originate due to attitude control systems and thermal changes in the optics of a space-based observatory. Ground-based applications of active or adaptive optics on slower time scales include correcting gravitational sag, differential flexture, and thermal drift. We are especially looking forward to studying the PMADM's response to the laboratory laser heating test, which will provide demagnetization and focus adjustment without translation of the drive magnet. Since photoactuation requires heating to achieve demagnetization, thermal relaxations times for these actuators are expected to be relatively slow (~1 Hz) (Li et al.). However, improvements can be made by reducing the PDMS-C layer thickness or by increasing the heat transfer coefficient. Using a thin, homogeneous, metallic, magnetic substrate can also aid in conduction in vacuum environments, thus enhancing the response time of the PMADM.

The PMADM optics are not initially flat and while the current implementation presents with an initial curvature, this is not unusual in active optical systems, where the residual stress curvature of MEMS DMs is commonly accounted for by an initial defocus of upstream optics or a "flat-map" of distortion voltages.

Additionally, focus powered DMs are desired to minimize the number of reflections in some systems, for example, in coronagraphs and adaptive optics systems. Mounting geometry optimization and bonding process refinement are also expected to minimize the mounting stress.

An advantage of the PMADM is that it performs focus adjustment in a complete contactless fashion and can be tuned to have a large or small stroke to correct other aberrations. An electromagnet to test the device till failure to validate the maximum stroke simulation can also be employed.

Figure 16:
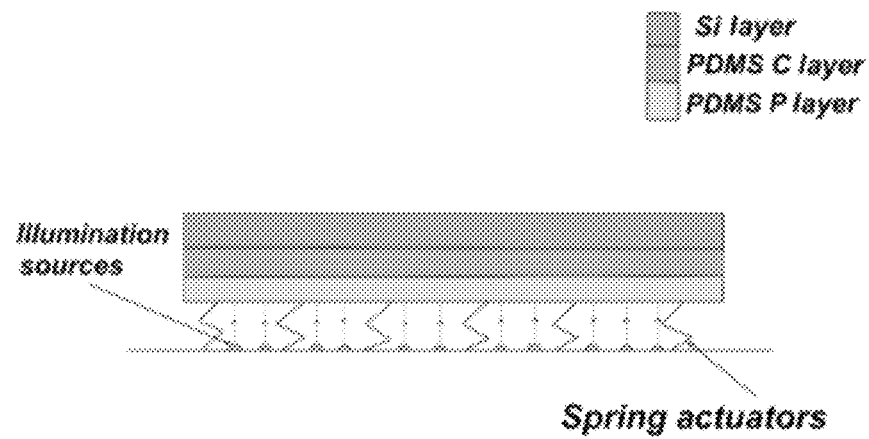
FIG. 16 is an Illustration showing how the PMADM can be supported using spring actuators to facilitate scaling to larger areas, in accordance with an embodiment.

The prototype can also be scaled to larger areas using spring actuators as shown in FIG. 16 larger area will require less magnetic load for the same amount of focus change and the spring actuators will help in keeping the mirrors flat under magnetic load. Local demagnetization will allow springs to relax locally in comparison to other spring actuators and will offer more spatial control. With reference to FIG. 16, an illustration is provided showing how the PMADM can be supported using spring actuators to facilitate scaling to larger areas. A plurality of springs extend between a base on which illumination sources are positioned, and a PDMS P layer, with a PDMS C layer being positioned above the Player, and a Si layer being positioned above the C layer. The magnetic load will compress the springs and will help in keeping the mirrors flat. Local demagnetization will allow relaxation of springs locally providing more spatial control. Demagnetization of the magnetic layer can be achieved using illumination sources as shown in the illustration.

The technology shows potential for applications where precision is required and where optical control is more feasible than using high voltages/powers, such as in vacuum, space, and low-gravity environments.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A photo-magnetically actuated deformable mirror having a mirror surface, comprising:
   a. a magnetic layer comprising a predetermined chemical coating;
   b. an optical quality substrate layer; and
   c. a magnet adapted to deform the mirror surface.

2. The photo-magnetically actuated deformable mirror according to claim 1, wherein the predetermined chemical coating comprises Polydimethylsiloxane (PDMS) and powdered ferromagnetic $CrO_2$.

3. The photo-magnetically actuated deformable mirror according to claim 2, wherein the powdered $CrO_2$ has a predetermined Curie temperature selected to permit changing the magnetization of the magnetic layer using the laser heating source, whereby control is provided over the deformation.

4. The photo-magnetically actuated deformable mirror according to claim 3, wherein the predetermined Curie temperature is about 395 K.

5. The photo-magnetically actuated deformable mirror according to claim 1, further comprising a spatially and temporally variable heating source.

6. The photo-magnetically actuated deformable mirror according to claim 1, further comprising a laser heating system.

* * * * *